May 13, 1924.
A. GERSTADT
SPEED CHANGE GEAR
Filed Sept. 4, 1923
1,493,932
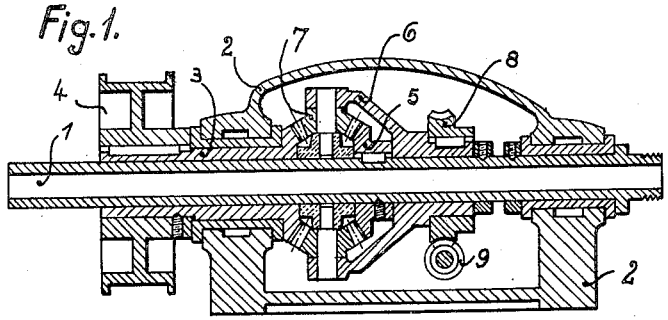
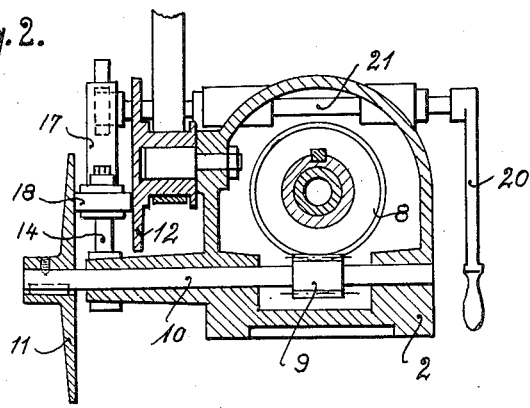
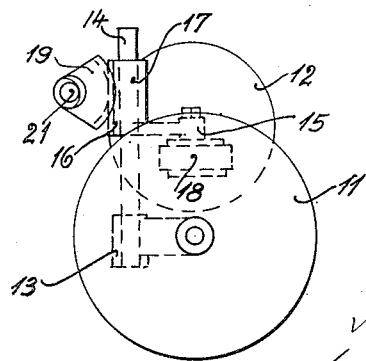

Patented May 13, 1924.

1,493,932

UNITED STATES PATENT OFFICE.

ANTON GERSTADT, OF BERLIN-CHARLOTTENBURG, GERMANY.

SPEED-CHANGE GEAR.

Application filed September 4, 1923. Serial No. 660,833.

*To all whom it may concern:*

Be it known that I, ANTON GERSTADT, a citizen of the German Republic, residing at Berlin-Charlottenburg, Goslarer Platz 5, Germany, have invented certain new and useful Improvements in a Speed-Change Gear (for which I have filed application in Germany October 10, 1921), of which the following is a specification.

The present invention relates to a speed change gear in which the drive of the working shaft is effected by a planet gear and in which the casing carrying the planet wheels receives an additional movement by means of a friction disc gear working over a worm and worm wheel. The characteristic feature of the invention consists in this that one of the two friction discs arranged parallel to each other is fixed to the worm shaft, so that the counter pressure reacting from the planet gear effects an axial movement of the worm shaft whereby the friction roller slidably arranged between the two friction discs is pressed against the friction discs. By this means the planet gear casing may be rotated backwards by the reaction pressure of the driven shaft only as quickly as the self-locking worm, positively connected to the friction disc gear, allows, so that any desired number of revolutions may positively be maintained at the driven side.

The known devices of this kind have the disadvantage that the transmission of power is effected more or less by the friction disc gear, whereby at the driven side the power acting against the drive can only be very small and a very high number of revolutions is required. Friction disc gears in combination with planet gears are also known in which the numbers of revolutions between the driven and the driving shafts are to be positively regulated by the friction discs, depending for this purpose on the numbers of revolutions of the driven shaft, and in which the power of the driving as well as of the driven shaft is transmitted through the friction disc gear. When running under load, however, this power reacting at the driven shaft effects a braking action upon the friction discs and it may even happen that thereby the driven side completely stops, whereupon the planet wheels rotate with a greater number of revolutions and destroy the friction disc gear. Moreover these gears have the disadvantage that the friction discs, intended for the transmission of the power, are by means of a feather slidably fixed to their shaft, so that the shifting is effected under load which is possible only by a great expense of power.

In order to avoid these drawbacks the friction gear according to the invention is driven independently from the planet gear with a constant number of revolutions and the numbers of revolutions of the driving disc and the worm shaft are so related to each other that never a leading of the casing of the planet wheels with regard to the driving disc is caused, i. e., the friction gear regulates the giving way of the casing only and is not used to transmit the power for the drive of the driven shaft but gives more or less quickly way to the reaction pressure as required by the friction roller. Furthermore the friction roller is in a known manner journalled to a slide connected to the hand lever so that the shifting of the roller may be effected without expense of power.

In the accompanying drawing a gear according to the invention for the drive of the working spindle of a machine tool is shown by way of example. Fig. 1 is a longitudinal section through the spindle head stock. Fig. 2 is a cross section showing the arrangement of the friction discs. Fig. 3 shows a rear elevation of the friction disc gear.

As shown in Fig. 1 the working spindle is journalled in the head stock 2 in such a manner that the rear end of the spindle revolves in the elongated hub 3 of the bevel gear upon which the driving disc 4 is fixed. Fastened to the working spindle 1 is a second bevel gear 5 which is driven from the wheel 3 by means of the planet wheels 7 fixed loosely to the casing 6. The casing 6 rotates freely about the spindle 1 and is connected to a worm wheel 8 by a wedge. A worm 9 engaging with the worm wheel 8 is fixed to a shaft 10 the rear end of which extends over the head stock and carries a friction disc 11 also fastened by a wedge. Above the shaft 10 a fixed pin or stud is fastened to the head stock 2 which carries the loosely rotating second friction disc 12. As shown in Fig. 3 an ear 13 is provided at one side of the bearing of the shaft 10, and in this ear a vertical pin or stud 14 is fixed upon which a slide 17, carrying an ear 15 and a toothed rack 16, is arranged. The slide 17 carries the friction roller 18 covered with leather or rawhide and serving for the transmission of the movement from the friction disc 12 to the friction disc 11. A toothed segment 19, fixed together with the operating hand lever 20 to a shaft 21, engages with the rack 16 of the slide 17. The roller 18 rotates loosely and in ball bearings so as to be shiftable without expenses of power.

The new gear works as follows:

The driving disc and the bevel wheel as well as the friction disc 12 are driven at constant speed by means of the intermediate gear. If now the wheel 3 rotates in the direction of the arrow A and if the roller 18 is located in the middle of the disc 12 so that no movement is transmitted to the worm wheel 8, the movement is transmitted to the wheel 5 by the wheels 7, whereby the wheel 5 is rotated at the same speed, but in an opposite direction. The pressure on the tooth acting upon the pin or stud of the wheels 7 is transmitted to the worm 9, and as this worm is self-locking the casing is compelled to stop. It is therefore absolutely impossible that the pressure on the tooth may transmit an acceleration or a retardation to the friction disc gear. This pressure acting upon the casing 6 in the direction of the arrow A only causes a greater pressing of the two friction discs against the roller 18. If now the roller 18 is shifted by the hand lever 20 from the middle of the disc 12 downwards, the friction disc 11 and the worm 9 are rotated. As, however, the pressure on the tooth acts in the direction of the arrow A upon the casing 6, the worm wheel can follow the worm as quickly only as the friction gear allows. If such a ratio of the gear is chosen that the speed of the worm wheel 8 is half as great as that of the driving disc, the wheel 5 will stop completely and the planet wheels 7 will roll about the wheel 5 only. It is hereby to be observed, however, that any power which for instance during working counteracts the rotation of the spindle is transmitted from the worm 9 to the friction gear as shearing force only. As seen therefore any speed may be put in free of shock by the lever 20 whereby, however, the power necessary for working is transmitted by the wheels arranged upon the spindle 12 only, so that the friction disc gear is not at all used for transmission of power. Moreover the heavier the cut at the spindle 2 the more intensive the contact of the rotating surfaces of the friction gear so that any slipping and grinding will be absolutely impossible and the life of the gear not affected.

The friction disc gear is not used to transmit any power but only serves the purpose of giving the worm a definite number of revolutions which the worm wheel may follow irrespective of the friction gear being adjusted to high or low speed. At the driven side therefore always the number of revolutions determined by the friction gear is positively maintained irrespective of a great or small power to be transmitted. The new gear is suitable for the drive of machine tools, especially slicing lathes, as well as for the drive of motor cars the numbers of revolutions of which are to be altered during running under load.

Having thus fully described my invention what I claim is:

1. In a speed change gear, a head stock, a working spindle journaled in the head stock, a bevel gear having a hub loosely mounted upon said spindle, a driving disk fixed to said hub, a casing loosely arranged upon said spindle, a second beveled gear fixed to said spindle, planet wheels rotatably mounted on the casing adapted to rotate the second mentioned bevel gear, a worm wheel fixed to said casing, a spindle, a worm carried by the second mentioned spindle and engaging the worm wheel, a friction disk carried by the second mentioned spindle, a second friction disk journaled on the head stock, a friction roller arranged between the two friction discs, the coaction between the worm wheel and worm normally tending to so displace the second-mentioned spindle as to engage the friction disc fixed thereto with the friction roller.

2. In a change speed gear, a head stock, a working spindle journaled in the head stock, two bevel gears mounted upon said spindle, a casing, planet wheels carried by the casing and coacting with the bevel gears, a worm wheel fixed to the casing, a friction disc, a worm engaging the worm wheel, an axially movable spindle carrying the friction disc and the worm, a second friction disc rotatably mounted upon the head stock, and a friction roller arranged between the two friction discs, the coaction between the worm wheel and worm normally tending to so displace the axially movable spindle as to engage the friction disc carried thereby with the friction roller.

3. A change speed gear as claimed in claim 2 characterized by the provision of a stud carried by the head stock, and a slide movably mounted on said stud and supporting the roller for movement between the friction discs.

4. A change speed gear as claimed in claim 2 characterized by the provision of a stud, a slide mounted for movement on said stud and supporting the roller for movement between the friction discs, a rack on said slide, a shaft, a segment carried by the shaft engaging said rack, and a lever carried by said shaft for oscillating the latter together with the segment whereby to vary the position of the roller between the friction discs.

In testimony whereof I affix my signature.

ANTON GERSTADT.